(12) United States Patent
Adjaoute

(10) Patent No.: US 9,213,990 B2
(45) Date of Patent: Dec. 15, 2015

(54) METHOD OF REDUCING FINANCIAL FRAUD BY USER DEVICES PATRONIZING COMMERCIAL WEBSITES

(71) Applicant: Brighterion, Inc., San Francisco, CA (US)

(72) Inventor: Akli Adjaoute, Mill Valley, CA (US)

(73) Assignee: Brighterion, Inc., San Francisco, CA (US)

( * ) Notice: Subject to any disclaimer, the term of this patent is extended or adjusted under 35 U.S.C. 154(b) by 0 days.

(21) Appl. No.: 14/675,453

(22) Filed: Mar. 31, 2015

(65) Prior Publication Data
US 2015/0206214 A1 Jul. 23, 2015

Related U.S. Application Data

(60) Division of application No. 14/517,863, filed on Oct. 19, 2014, which is a continuation-in-part of application No. 14/454,749, filed on Aug. 8, 2014, and a continuation-in-part of application No. 14/180,370, filed on Feb. 14, 2014, and a continuation-in-part of application No. 14/517,771, filed on Oct. 17, 2014.

(51) Int. Cl.
| | |
|---|---|
| *G06Q 30/00* | (2012.01) |
| *G06Q 30/06* | (2012.01) |
| *G06Q 20/40* | (2012.01) |
| *G06Q 50/26* | (2012.01) |
| *H04L 29/06* | (2006.01) |
| *H04L 29/08* | (2006.01) |
| *G06Q 20/12* | (2012.01) |

(52) U.S. Cl.
CPC ........... *G06Q 30/0609* (2013.01); *G06Q 20/12* (2013.01); *G06Q 20/4016* (2013.01); *G06Q 50/265* (2013.01); *H04L 63/1425* (2013.01); *H04L 67/22* (2013.01)

(58) Field of Classification Search
USPC ................................................. 705/26.35, 64
See application file for complete search history.

(56) References Cited

U.S. PATENT DOCUMENTS

2007/0239604 A1* 10/2007 O'Connell et al. ............. 705/50
2010/0228656 A1* 9/2010 Wasserblat et al. ............ 705/35

* cited by examiner

*Primary Examiner* — Tsan-Yu J Huang
(74) *Attorney, Agent, or Firm* — Richard B. Main; Main Cafe

(57) ABSTRACT

A real-time fraud prevention system enables merchants and commercial organizations on-line to assess and protect themselves from high-risk users. A centralized database is configured to build and store dossiers of user devices and behaviors collected from subscriber websites in real-time. Real, low-risk users have webpage click navigation behaviors that are assumed to be very different than those of fraudsters. Individual user devices are distinguished from others by hundreds of points of user-device configuration data each independently maintains. A client agent provokes user devices to volunteer configuration data when a user visits respective webpages at independent websites. A collection of comprehensive dossiers of user devices is organized by their identifying information, and used calculating a fraud score in real-time. Each corresponding website is thereby assisted in deciding whether to allow a proposed transaction to be concluded with the particular user and their device.

1 Claim, 10 Drawing Sheets

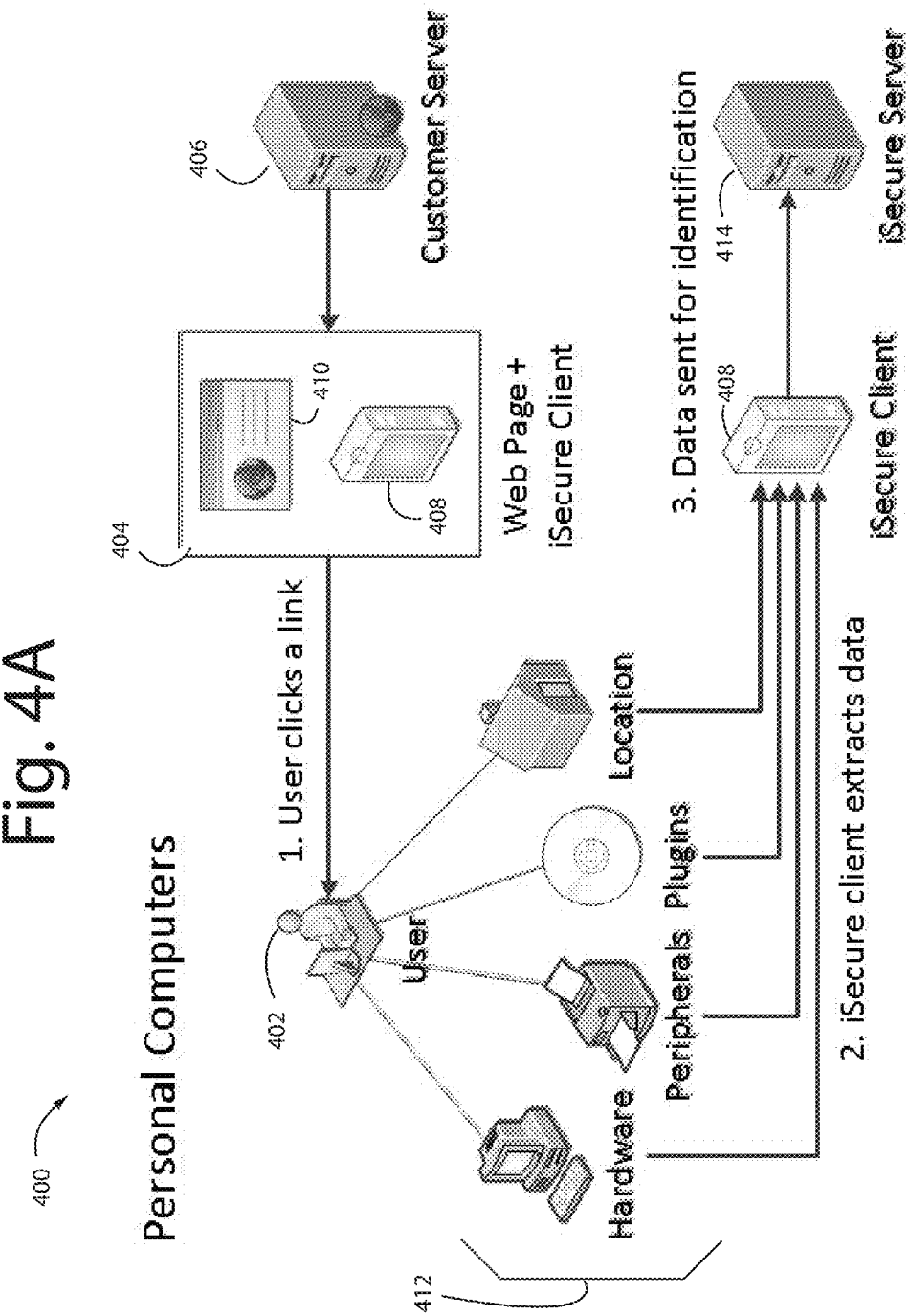

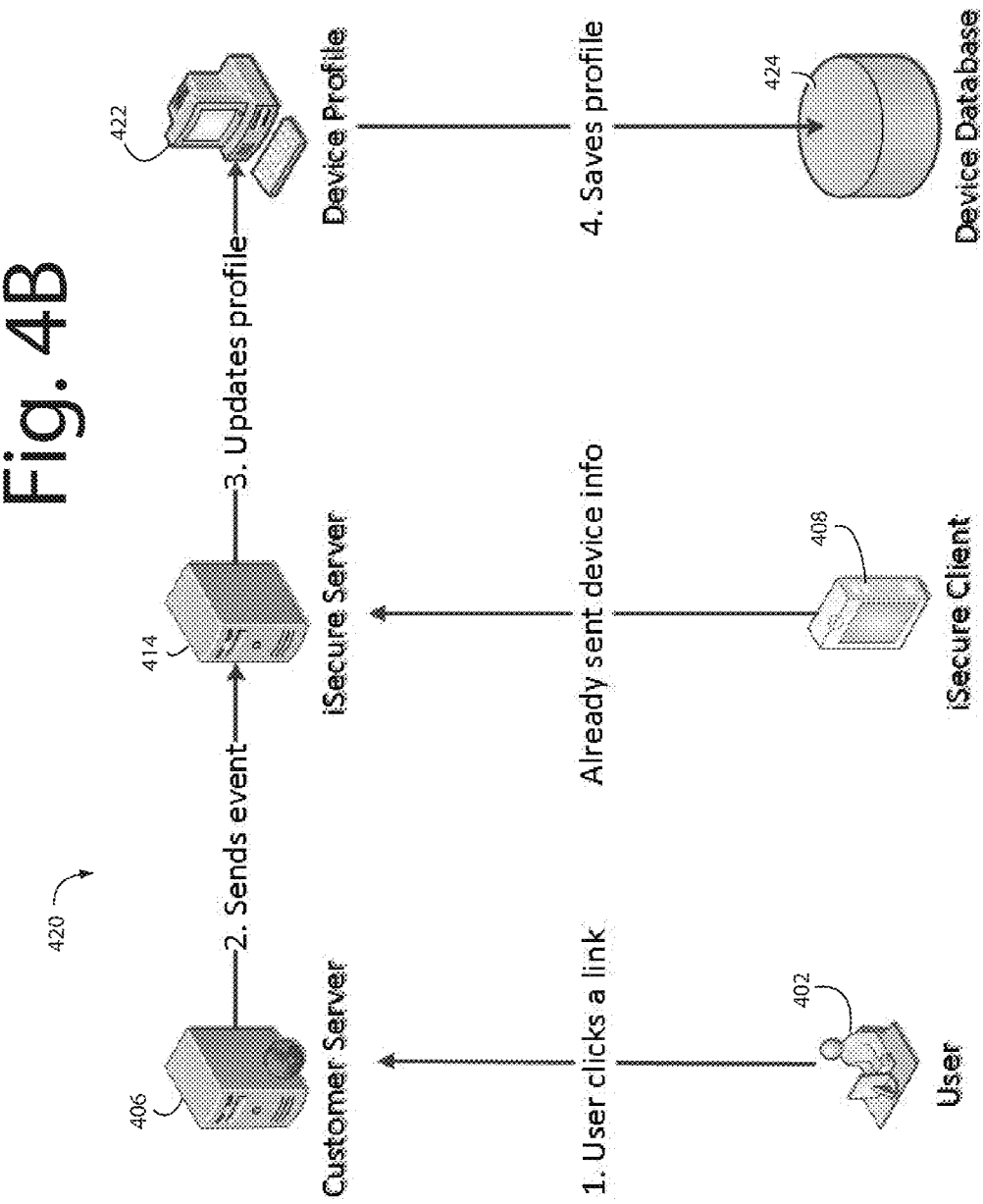

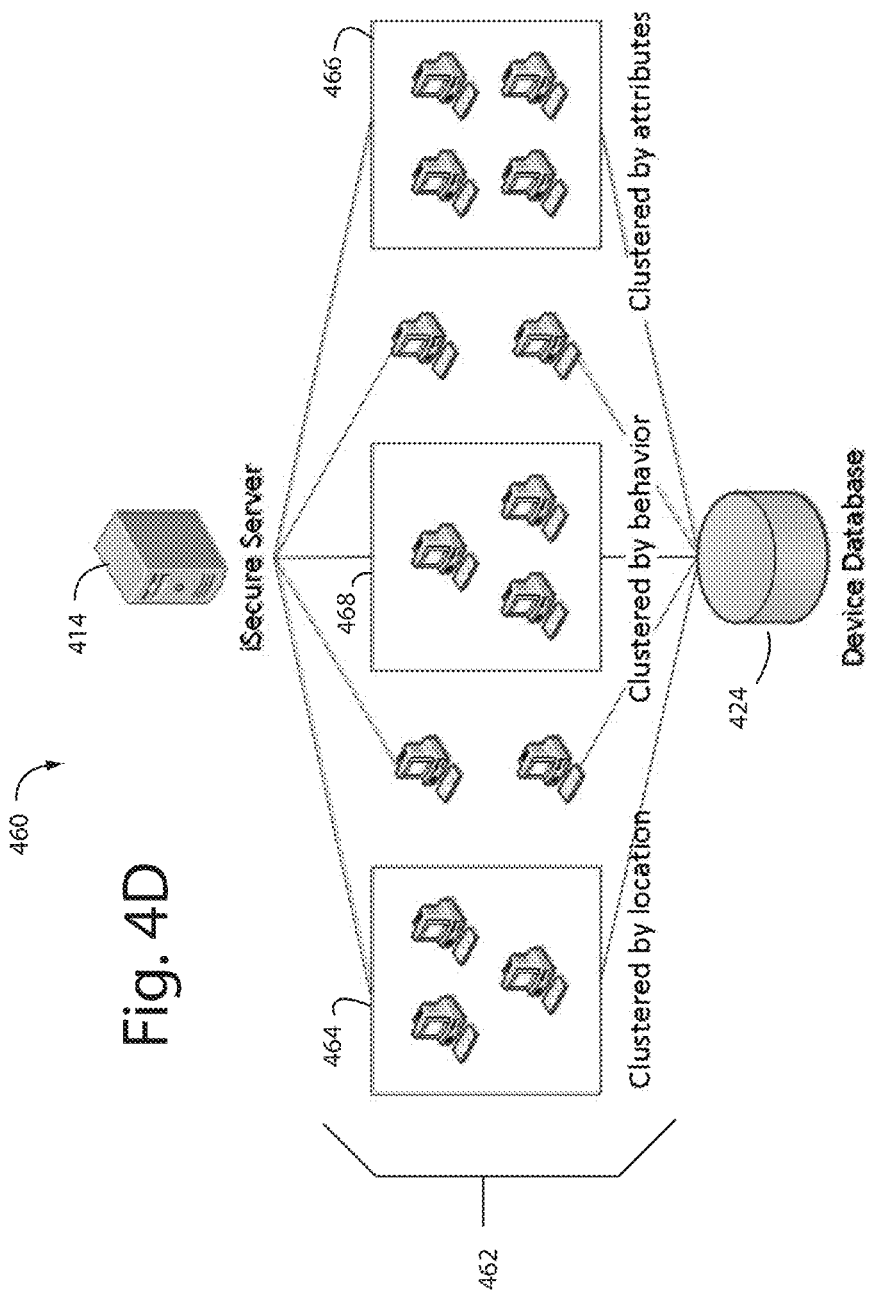

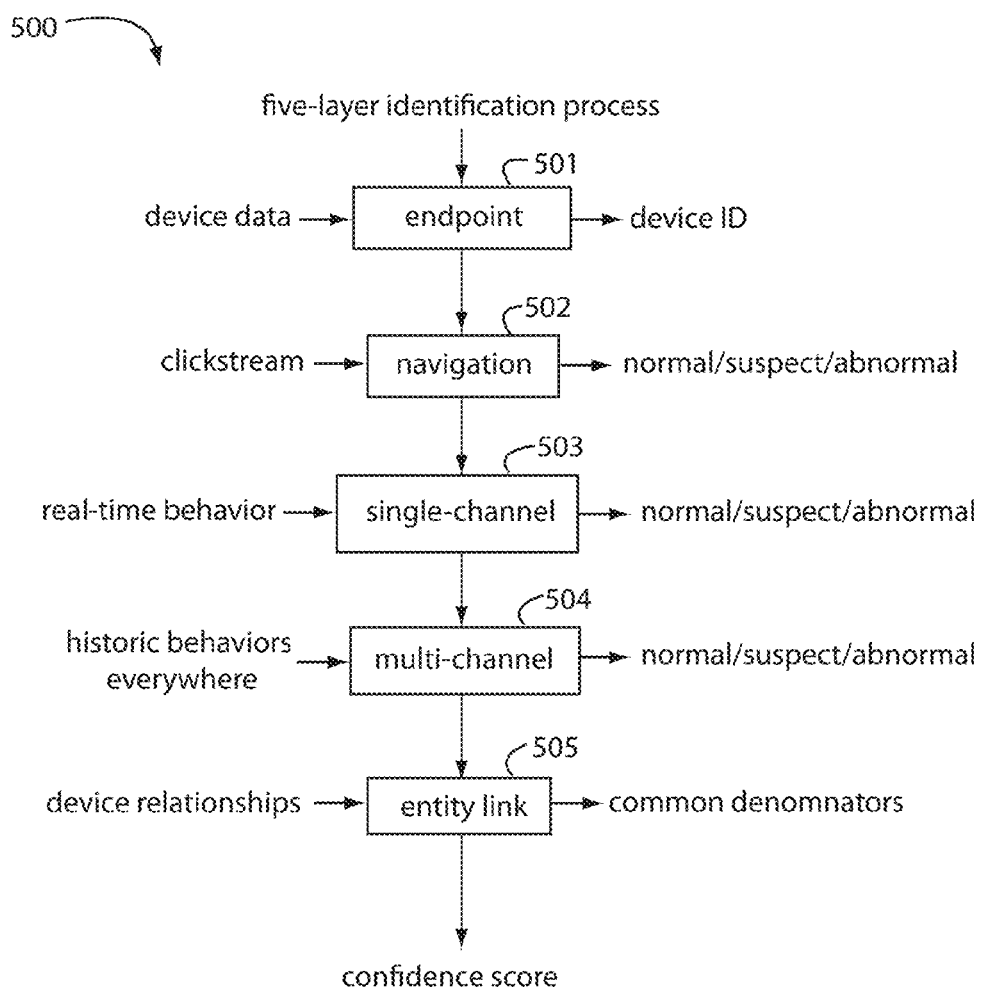

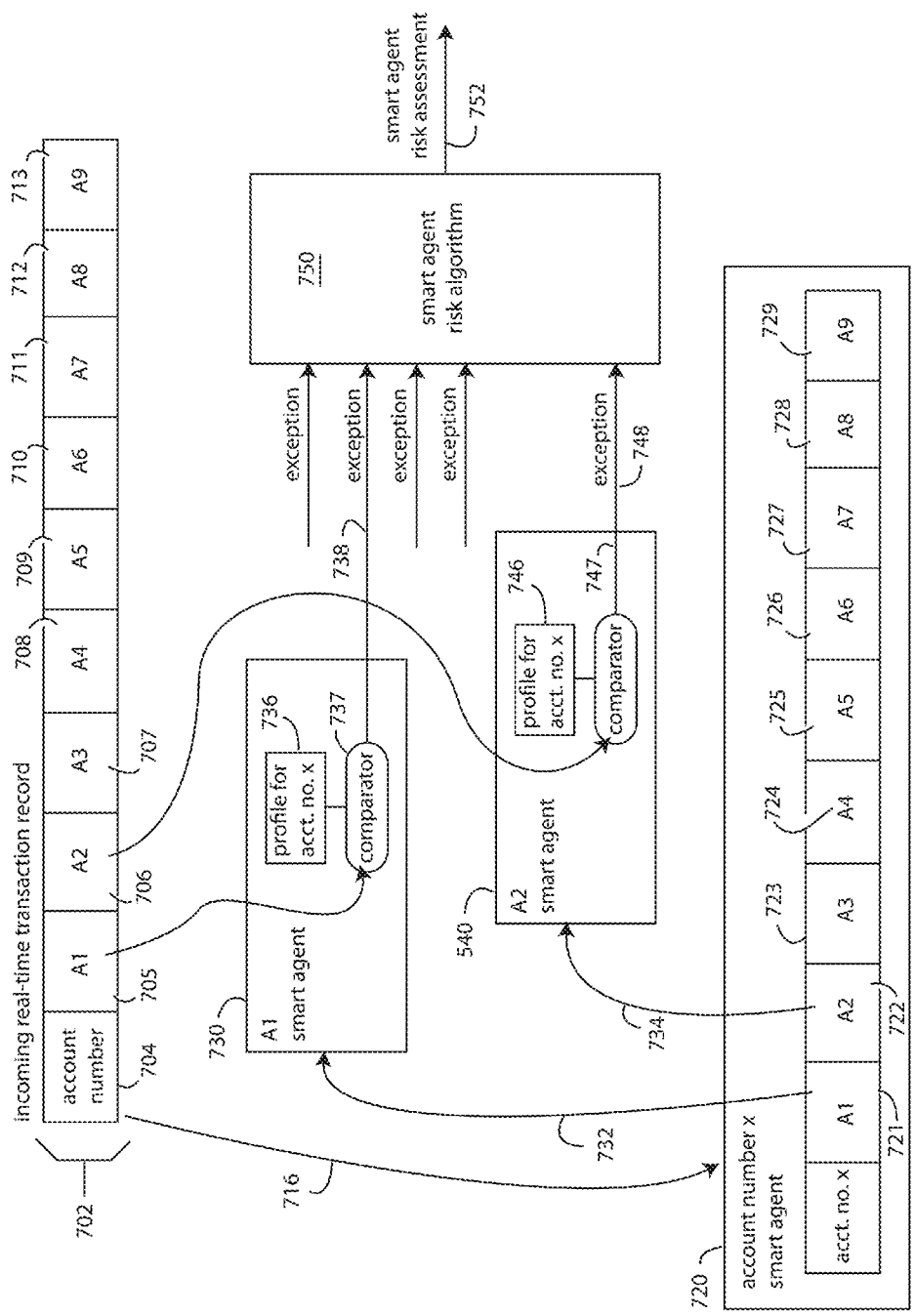

METHOD OF REDUCING FINANCIAL FRAUD BY USER DEVICES PATRONIZING COMMERCIAL WEBSITES

BACKGROUND OF THE INVENTION

1. Field of the Invention

The present invention relates to user authentication systems for webservers, and more particularly to webserver processes to provoke logged-in user devices to volunteer enriched device-identifying data sufficient to track and authenticate authorized users.

2. Background

Up until recently all that has been required of a fraudster to spoof a commercial website into completing a card-not-present retail transaction is to have a few stolen user account details. These could even be provided anonymously. Controlling the resulting loses has proven to be very difficult and expensive.

The most cost effective way to deal with fraud is to stop it in real-time before it has a chance to be completed. Once completed, detecting and recovering from the fraud has always been very inefficient.

The world is not so small as it once was where we all knew each other on sight and understood through past experience who could be trusted. In nineteenth century America, households universally ran tabs at the corner grocery store and paid the tabs at the end of the month. Nobody ever required credentials to be presented, you were recognized immediately. Today, we very rarely have retail situations where the merchants and customers know each other. On-line transactions are even worse, they provide automatic anonymity and quick, easy escape.

It seems obvious that collecting personal information from the users would be a good way to authenticate each user so the details could then be used as keys to authorize subsequent transactions. But very strong political groups have pushed back and prevented authentication technologies that would collect and use personally identifiable information (PII). In some jurisdictions, laws have been enacted to make the technology illegal.

So in a less-than perfect fallback technology, remote users are being authenticated over a network connection with a webserver by reading the electronic signatures of personal trusted devices and the recognizable ways users use the to navigate webpages. But conventional methods have failed to uniquely identify users by their devices sufficient to enable tracking and authentication.

Although there are a billion different users and devices possible, there are trillions of different ways the individual user devices can be configured and ways the users themselves behave. Given that enough descriptors can be collected, it would be possible to uniquely identify each user and their devices with very high confidence. Certainly enough to take away a large part of the risk away from on-line transactional fraud.

ThreatMetrix, Inc. (San Jose, Calif.) markets their Trust-Defender™ Mobile security product and describes it as a context-based authentication and fraud protection process for mobile devices. A Whitepaper published online by Threat-Metrix says its Mobile Device Analytics technology uses two ways to uniquely fingerprint mobile and PC user devices to detect cybercriminals and authenticate returning customers. An Exact-ID provides positive identification and context-based authentication based on cookies and multiple device identifiers across PCs and mobile devices. A Smart-ID provides cookie-less device identification using dynamic attribute matching based on from network packet and browser fingerprints instead of static fingerprint matching. The Smart-ID technology uses a machine learning approach that takes into account per-customer and global device profile patterns to generate reliable device identifiers with confidence. In contrast to fingerprint methods that are effectively static, Smart-ID is said to provide adaptive, cookie-less identification that is tolerant to incremental and non-linear changes.

Both Technologies are claimed to be globally unique. Each are generated in real-time based on data collected for that transaction. The data collected is matched against "billions" of device profiles stored in the so-called "ThreatMetrix Global Trust Intelligence Network." Such is used to identify both trusted users and known high risk attackers. It cross-correlates hardware, operating systems, applications, internet protocols and location-centric factors in a multi-factor authentication for spoof detection.

The device attributes in mobile devices are described in the WhitePaper as being different than those in laptop/desktops, so different techniques and algorithms are needed to profile mobile-specific data. The mobile device attributes that can be collected include IMEI data, carrier information, protocol information, SIM card-related information, mobile device attributes, mobile device configuration related information, and other supported mobile device identifiers. GPS coordinate data can be used in authentications, but only if the user has granted the applicable permissions.

Operating system, application, browser and network packet behavior, and other forensics are used by ThreatMetrix to detect malicious threats associated with transactions. Packet headers and their changes in state over time are analyzed to determine if the source is malicious or not. Hidden risks are detected by examining anonymous packet header data each time the a user requests a webpage. This can help determine whether the originating device is being masked or tunneled by anonymous or hidden proxies or subject man-in-the-middle attacks.

Various conventional techniques are described in the WhitePaper to detect threats. E.g., Detection of VPN use; Detection of out-of-country satellite; dialup or mobile broadband connections; Proxy piercing to detect true IP address and true geolocation data; Detection of mismatch between operating system information detected by the browser and operating system information reported by packet information; and, Detection of device anomalies that suggest a jail-broken device or a transaction spoofing mobile device properties.

ThreatMetrix describes using webpage fingerprinting to detect changes to webpages by malware or Man-In-the-Middle and Man-In-the-Browser attacks. Such whitelisting technology is said not to depend on traditional malware signature matching. Attempts by malware to modify the webpage by introducing any new elements or JavaScript is instantly recognized. When combined with other packet and browser based indicators, ThreatMetrix claims to provide high confidence scoring of malware on the PC or mobile device.

Context data is used for analysis and risk scoring, as well as for building a personal-ID that represents a digital fingerprint of a user. Transaction data describes how a given user interacts and behaves, and provides an additional context to square historic behavior with a current action.

ThreatMetrix customers are asked to forward hundreds of user device attributes they have access to when a user logs onto their webpages. These user device attributes represent digital fingerprints of users and are forwarded in real-time to the "global network." The information is typically encrypted using private keys. The ThreatMetrix global network server works to identify returning customers and computes a baseline for good behavior.

U.S. Pat. No. 8,141,148, titled, Method and System for Tracking Machines on a Network Using Fuzzy GUID Technology, describes cookie-less device identification and global device recognition. It claims to be impervious to cookie deletion and copying. The technology is described as being included in the ThreatMetrix SmartID™, which uses device fingerprint attributes to assess online transaction risks.

U.S. Pat. No. 8,176,178, titled, Method for Tracking Machines on a Network Using Multivariable Fingerprinting of Passively Available Information, describes a device recognition risk-assessment method to detect cybercriminals who use proxies and VPNs. It looks into historical information related to user devices. This can help understand the true geo-locations of user devices and thereby improve the detection of cybercriminals.

Conventional, Boolean Logic sorts information into black/white, yes/no, true/false, and day/night binaries. Fuzzy Logic allows for a middle ground, it allows for shades of gray, the partially true and partially false that make up much of day-to-day human reasoning.

Fuzzy Logic is a superset of conventional logic that has been extended to include truth values between "completely true" and "completely false". Fuzzy Logic alone is not capable of recognizing an individual device. The main benefit of using Fuzzy Logic is it allows a confidence score between zero and one to be computed, as opposed to take it or leave it binary results of just true or false. Individual elements can then belong to two different fuzzy sets, not just one set as in classical logic.

Device identifications based on fuzzy logic, business rules, statistics, or neural networks can only be taken so far. The calculation of device ID's is unfortunately limited by the facts that can be extracted from the available browser, operating system, JavaScript version, language employed, plugins installed, font choices, IP-address, geo-location, screen resolution settings, HTTP header, and connecting user agent information. These data provide over a hundred points that can be used to search for comparables in its exiting records that were fashioned from previous website visits.

Conventional techniques try to compare devices in each new connection to those encountered before and characterized in its database of records. For example, using a set of rules and/or probabilities and or neural networks and or fuzzy logic to provide a score between [0, 1] to identify the device.

These simple techniques can only work if the device parameters do not change too much since the last visit and are relatively stable. Such simple technology can be challenged and fail if called on to recognize devices which have been refreshed into obscurity by device updates and upgrades.

SUMMARY OF THE INVENTION

Briefly, a real-time fraud prevention embodiment of the present invention enables merchants and other commercial organizations on-line to assess and protect themselves from high-risk users. A centralized database is used to build and store dossiers of user devices and behaviors collected from numerous subscriber websites in real-time. Real, low-risk users have webpage click navigation behaviors that are very different than those of fraudsters. Individual user devices can be distinguished from a billion others by the hundreds of points of user-device configuration data each independently maintains. The user devices are persuaded into volunteering these configuration data when visiting respective webpages at independent websites. The collection of comprehensive dossiers of user devices are organized by their identifying behavior and device-ID information, and both are used to calculate a fraud score in real-time. Each corresponding website is thereby assisted in deciding whether to allow a proposed transaction to be concluded with the particular user and their device.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 4A is a functional block diagram of the endpoint layer of FIG. 3;

FIG. 4B is a functional block diagram of the profiling layer of FIG. 3;

FIG. 4D is a functional block diagram of the relational layer of FIG. 3; and

FIG. 5 is a flowchart diagram of how user device risk levels can be accurately categorized by a five-layer identification process that includes endpoint, navigation, single-channel, multi-channel, and entity link analyses;

FIG. 7 is a schematic diagram of how a smart agent embodiment of the present invention functions.

DETAILED DESCRIPTION OF THE INVENTION

Device identifications that use behavioral data to advance over simple device ID techniques will outperform and provide better results and lowered losses due to fraud. Behaviorally enhanced device ID is therefore a critical part of all embodiments of the present invention. It recognizes individual users will use their tools in repeatable, recognizable ways no matter what devices they are using at the moment.

It is important for merchant companies to constantly evolve their systems to stay in tune with developing standards, rapid technological changes, and keep up with ever more sophisticated and capable fraudsters trying to break in and abuse their systems.

Very few single dimension device ID technologies are effective in being able to uniquely recognize devices when the legitimate devices themselves are changing daily. Multi-layer, multi-dimensional fraud device identification is required now in a world where ever-more clever thieves and surprising new malware behaviors pop up daily.

In general, multi-layer behavioral device identifications can be had by combining multi-agent technology with case-based reasoning, real-time profiling, and long-term profiling. Multi-layer behavioral device identifications can guarantee correct device identifications even when many changes and updates have occurred on the devices. Better device identifications mean e-commerce can be safer and more secure for everyone.

Smart-agents are used in the embodiments of the present invention to create a virtual agent for each user device. Each such virtual agent is configured to observe and learn the behavior of its host user device over time to create a device profile. The ways the user device is used, the frequency of its use, the types of actions taken, e.g., during the last minute, ten minutes, over days/weeks/years are all intelligently aggregated into a profile of what's normal for this user.

Figure 1:
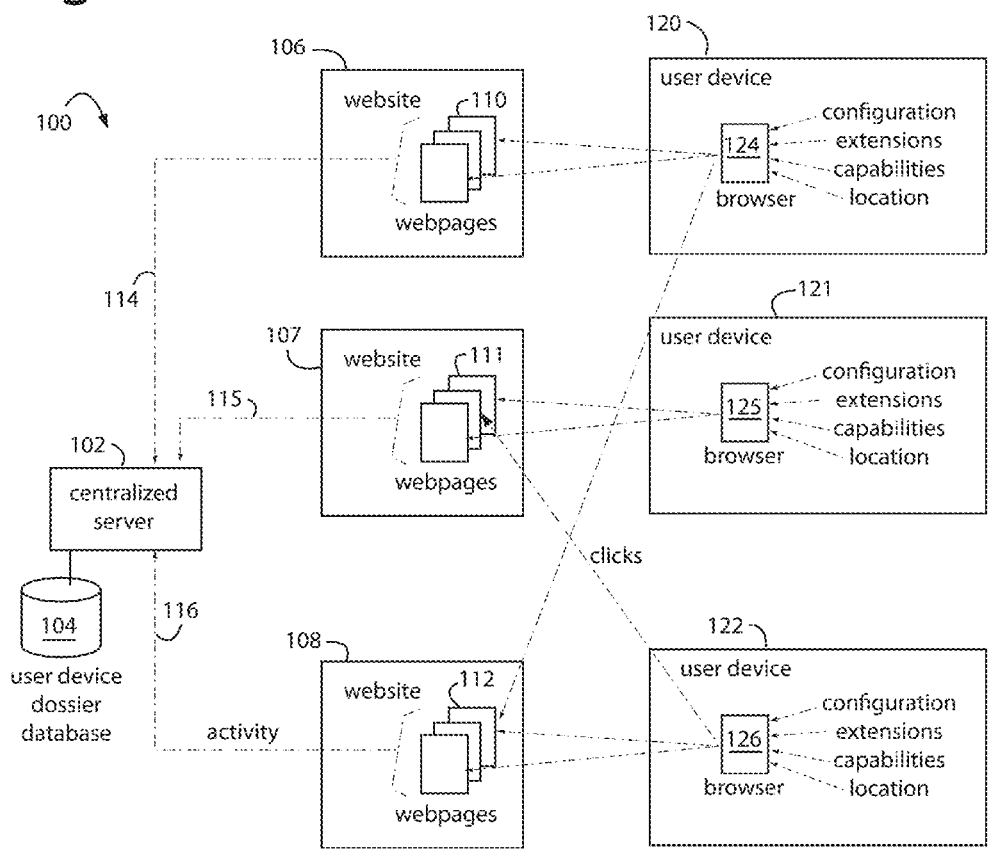
FIG. 1 is functional block diagram of a network-based system embodiment of the present invention for controlling commercial fraud in electronic commerce. The three websites shown represent what can be millions of independent websites on the Internet, and the three user devices represent billions of unrelated and independent user devices of all types that could be employed by a user to access any of the websites.

FIG. 1 represents a network-based system 100 for controlling commercial fraud in retail electronic commerce. System 100 revolves around a centralized server 102 with a user-device dossier database 104. These support several independent and unrelated Internet websites 106-108, each presenting corresponding webpages 110-112. Each such website 106-108 sends activity reports 114-116 to the centralized server 102 in real-time over the network as many independent and unrelated users visit and click through webpages 110-112.

What could be thousands, or even millions of user devices, are represented here in FIG. 1 as user devices 120-122, each have a browser or app 124-126 capable of surfing or visiting webpages 110-112. Each user device 120-122 can freely access any website 106-108, but when they do them and their behaviors become the subject of activity reports 114-116. The user devices themselves include the spectrum of mobile smartphones, tablets, laptops, and desktop computers.

The browsers and apps 124-126 associated with this spectrum vary tremendously, as do their particular configurations, extensions, capabilities, and locations, not to mention a hundred other parameters and characteristics. Each user device will usually be associated, at least temporarily, with a unique Internet IP address that can reveal the geographic location of the user device. These IP addresses can be and often are spoofed by fraudsters.

Many of these configurations, extensions, capabilities, locations, and other parameters and characteristics are volunteered by or can be queried from browsers and apps 124-126 and collected by websites 106-108.

Figure 2:
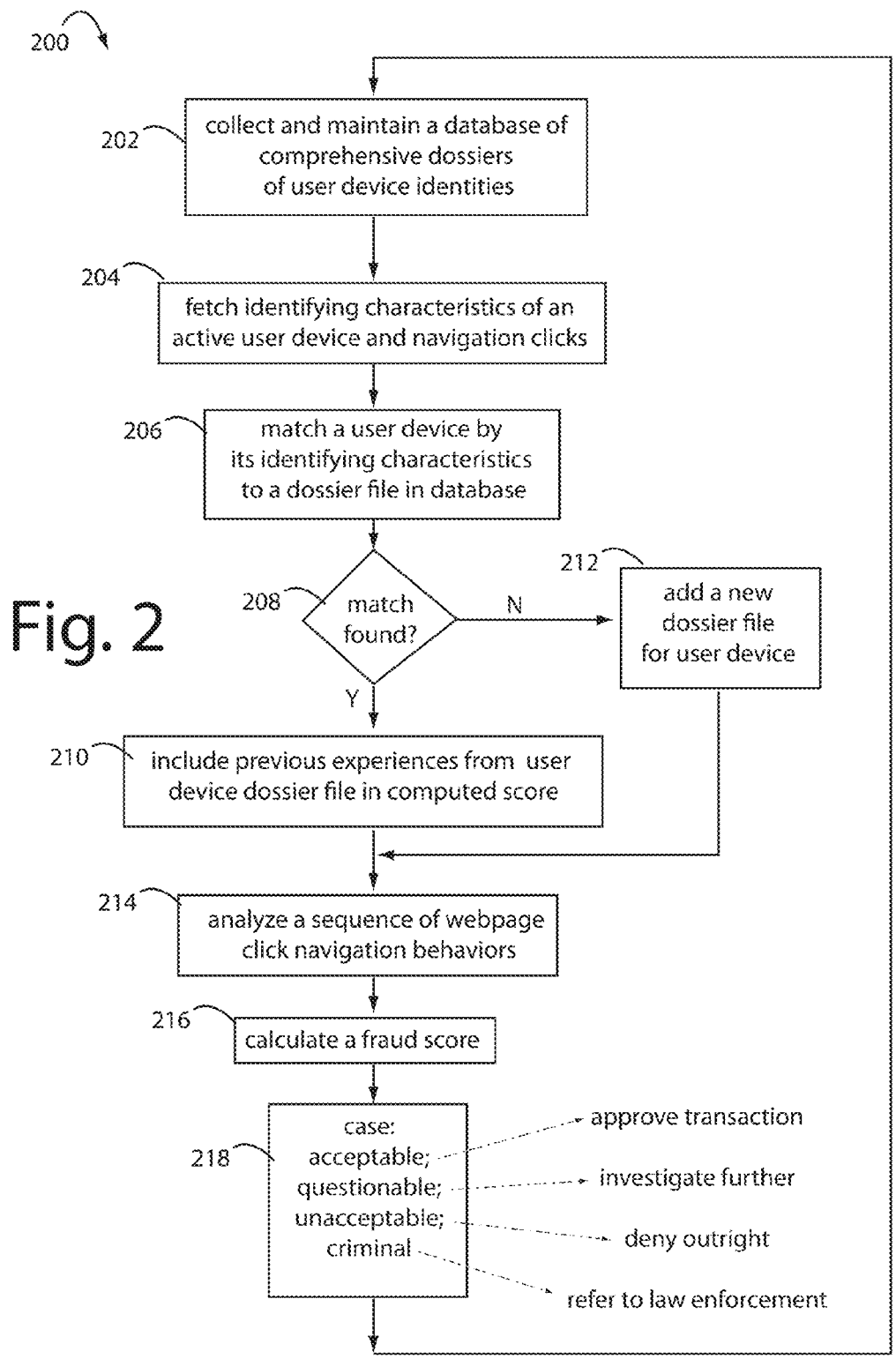
FIG. 2 is a flowchart diagram of a top level computer process useful in the system of FIG. 1.

FIG. 2 represents a network server method 200 for protecting websites from fraudsters. Method 200 includes a step 202 for accumulating and maintaining a database of comprehensive dossiers of user device identities. These identifying characteristics are fetched in a step 204 from activity reports about user-device visits to webpages as they are volunteered by the reporting websites. The assemblage and organization of user device identifying characteristics can be carried on over a period of time that can span months or even years. A step 206 tries to match each newly presenting user device 120-122 (FIG. 1) currently visiting a website 106-108 by its identifying characteristics to a particular user device identity dossier already in the database 104.

If a match is found in a step 208, any previous experiences with the particular user device by this or other included websites is included in a first part calculation of a fraud score. Such first part of the score is computed in a step 210. Otherwise, a step 212 builds and adds a new file to be inserted the database 104 for future use.

A step 214 analyzes a sequence of webpage click navigation behaviors of each corresponding user device then being employed to visit a particular webpage and website. A real person with a real purpose will navigate around and between webpages in a particular way. Fraudsters and automated crawlers behave very differently. A step 216 calculates a final or only part of the fraud score in real-time. A step 218 is configured as an output which useful to assist each website in determining whether to allow a proposed transaction to be concluded by a particular user device. For example, a good score predetermined to be acceptable would trigger an approval of a user transaction. A marginal score could be used to signal a call should be made, or investigated further. A poor score would issue an outright denial. A red-flag score could be used to alert law enforcement.

Whenever a particular user device 120-122 cannot be matched to any particular dossier file in the database, a new dossier file is opened up for such user device according to the user device identification parameters then obtained. The determination of a fraud score is necessarily limited to what can be surmised by analyzing the sequences of webpage click navigation behaviors that occurred. This limitation is reflected in the fraud score.

An endpoint client can be embedded in a webpage presented on a website and configured to provoke a browser 124-126 in a user device 120-122 to report back user device information, capabilities, extensions, add-ons, configurations, user device locations, and other data which are useful to sort through and contribute to corresponding user device dossier files maintained in the database 104. For example, FLASH PLAYER video, ACTIVEX, and JAVASCRIPT objects embedded in webpages 110-112 all naturally provoke a lot of useful identifying and characterizing information to be reported back from plug-ins and extensions already present each user device 120-122.

For example, JavaScript can be used to check various non-universal physical attributes of a particular user device, including its operating system, CPU architecture, video card, screen size, and other items that fluctuate widely in the real-world population. The data that can usually be obtained by JavaScript includes, user agent, Screen resolution, user language, time zone offset, graphics processing unit (GPU) information, list of specific fonts availability, list of plugins, list of MimeTypes, availability of cookies, availability of HTML5 properties and methods, attributes specific to the browser, etc.

If an innocuously small Flash video is included in the webpages, its normal protocols can be appropriated to provide extra information made available to the Flash player, e.g., information describing audio/video codecs, printers, touchscreens, and other peripherals. The physical location of a user device can be discerned from its IP address using a geo-location database to get the city, latitude, and longitude. Overall, two hundred fields can be gathered together and used to identify a single user device 120-122 with high degree confidence.

A mobile endpoint client is similar to the endpoint clients used for personal computers. It may not always be possible to gather identifying user device information with a browser. So mobile endpoint clients are constructed from small libraries of Java (for Android) or Objective C (for iOS) and included in a downloadable app. Once installed, the app is empowered to request a device ID from the mobile client. It is configured to gather user device information in the background and send it to server 102 for recognition and identification.

An unnoticeable web browser is launched in the background to gather data from various browser-specific fields. Running now as an application, all the system calls become available. These system calls can be used to retrieve the peculiar mobile user device's physical properties, e.g., the iOS/Android version, the size and resolution of the screen, the capabilities of the touchscreen, etc. The user's settings can also be accessed, as well as a list of all the apps then installed on this particular user device. All this information is useful in database 104 to characterize and distinguish the particular user device 120-122 from a million others.

Using IP addresses for geo-location is not entirely satisfactory, these can vary as a user moves around from one cell tower to the next or between WiFi routers. It's better to use the built-in GPS app if available. Most smartphones now include these in their standard kit.

A centralizing of the collecting and maintaining of a database of comprehensive dossiers of user device ID's allows for a much larger population to be obtained from countless user-device visits to numerous webpages maintained by many unrelated websites. The otherwise independent and unrelated websites each forward user device activity reports in real-time as they occur to a single centralized server 102 that solely controls and maintains database 104. Fraud scores are reported back to the corresponding websites, e.g., over the Internet. Such service can be by paid subscription. Embodiments of the present invention would be useful in commercial payment systems, peer-to-peer money transactions, physical access controls to buildings and other facilities, communication-command-control applications, and in sensitive document control.

In general, embodiments of the present invention protect websites from fraudsters by analyzing webpage click navigation behaviors each of device visiting their webpages, and by collecting and maintaining comprehensive dossiers of device ID's, and by producing a fraud score in real-time to assist the website in deciding whether to allow a proposed transaction to be concluded.

Figure 3:
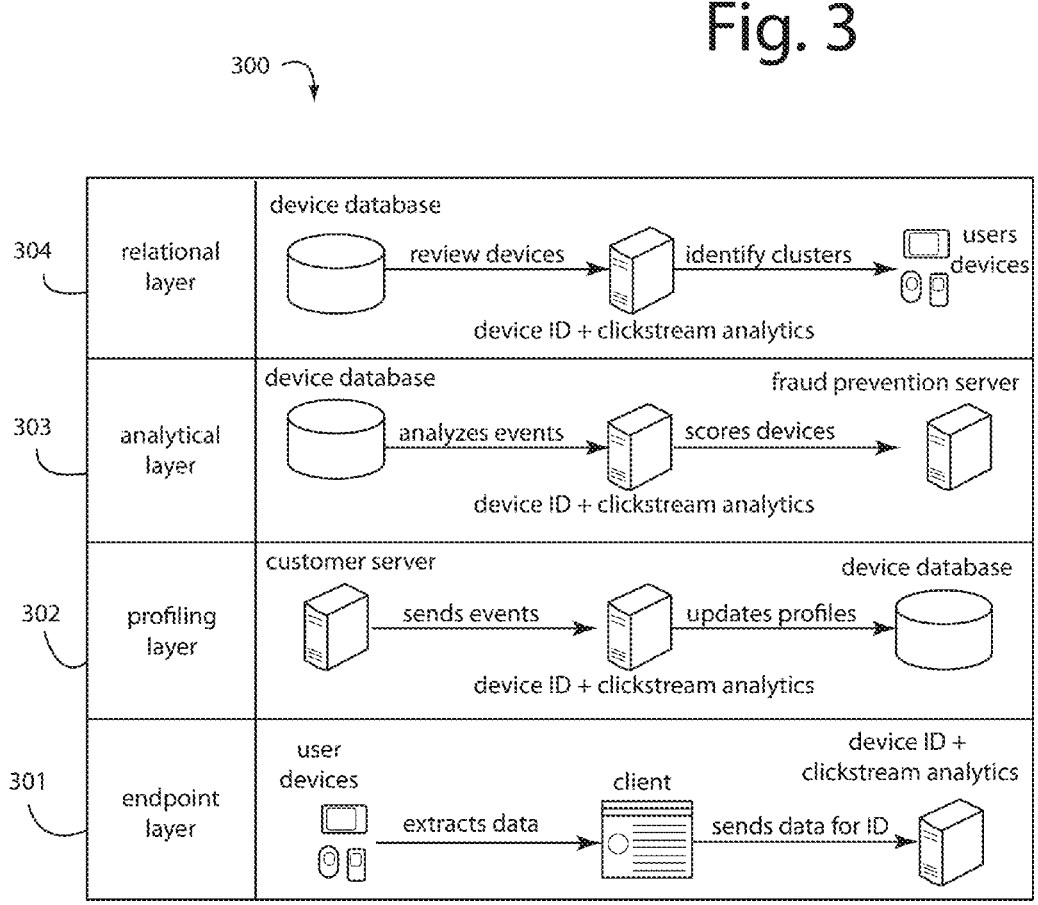
FIG. 3 is a schematic diagram representing the four layers of activity that occur in the systems of FIGS. 1 and 2.

In the abstract, embodiments of the present invention involve four layers of functionality: endpoint, profile, analytical, and relational. These are represented in FIG. 3.

In regard to an endpoint layer 301, whenever a user visits a customer's web site, an endpoint client is embedded in the webpage. The endpoint client is a lightweight collection of JavaScript, Flash, and other code. As a user scrolls through the webpage, the endpoint client runs in the background to gather all available information, and sends the collection back to a decision engine for identification.

A profiling layer 302 maintains a unique profile for each user device without hindering the user's browsing or overburdening the customer's server. Whenever a user clicks a link, the customer's server sends a brief message to the server containing the user's current IP address and the page ID. If device information from that IP has been recently received, it updates the corresponding device profile and saves it to a user device permanent history. If that IP hasn't been heard from recently, the event is temporarily saved pending a user device ID.

An analytical layer 303 runs in real-time whenever a device profile has been updated. After loading a user device profile from the database, the server updates its derived attributes and velocity counters. A series of clicks is interpreted to understand the user actions, such as viewing customer reviews and searching for products. The updated profile is sent to be scored in real-time. This scoring is based on an empirically developed fraud model, which uses business rules, neural networks, data mining, and other technologies to predict a user's future behavior.

A fourth layer 304 is the relational system, case-based reasoning is used to identify families and clusters of devices. Tests are made to see if any families can be discerned that are related by physical location, device attributes, or historical behavior. The relational layer deals with clusters of devices instead of one user device at a time. The trustworthiness of user devices can be modified based on similar user devices, especially if they appear to be on the same network, or interrelated in other ways.

FIG. 4A represents an endpoint layer 400 in greater detail. Whenever a personal computer user 402 visits a customer's web site 404 hosted by a customer's server 406, an endpoint client 408 embedded in a webpage 410 is included in any payload downloaded. The endpoint client 408 is configured to be an harmless collection of code that will trigger a volunteering of the user device's configuration and preferences 412. As the endpoint client 408 runs in the background, it gathers the information freed up into a collection reported back to a decision engine, or iSecure server 414 for user device identification by dossier matching. For example, a user agent is a string sent by browsers with each request. Each are associated with a unique browser, operating system, and version, so the various properties of the user device can be deduced. For example, WebGL graphics libraries can be employed to see what kinds of pipelines, shaders, and rendering modes a graphics card in a user device supports.

FIG. 4B represents a profiling layer 420, like 302 in FIG. 3, that maintains a unique profile 422 for each user device. Customer server 406 sends event messages to an iSecure server 414 enclosing the user's current IP address and the page ID. If device information from that same IP address has been recently received, the corresponding device profile 422 is updated and saved it to a user device permanent history in a database 424 (e.g., database 104, FIG. 1). If that IP hasn't been heard from recently, the event is temporarily saved pending further work to provide a user device identification.

Figure 4C:
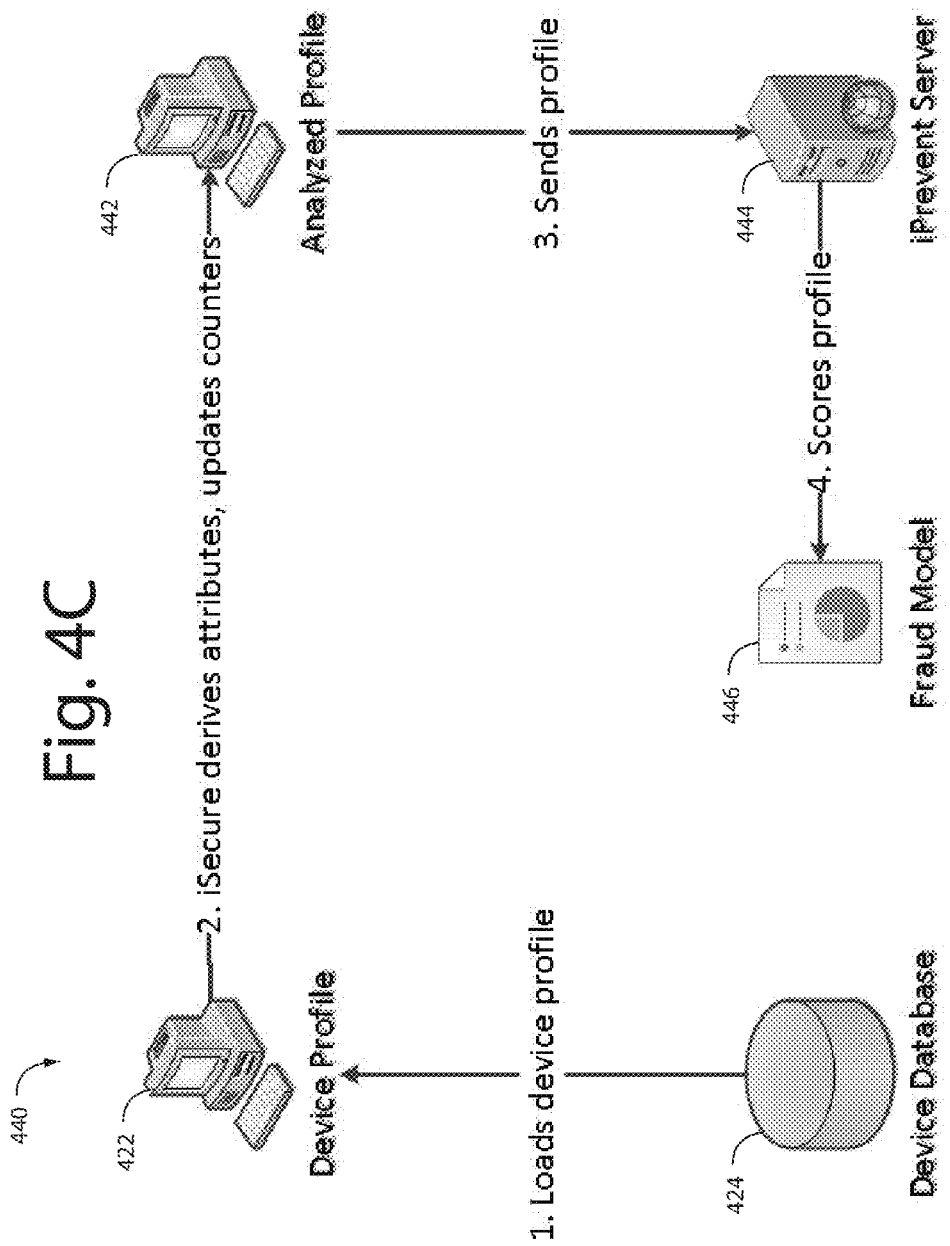
FIG. 4C is a functional block diagram of the analytical layer of FIG. 3.

FIG. 4C represents an analytical layer 440 in greater detail than 303 in FIG. 3. Analytical layer 440 runs in real-time whenever a device profile 422 has been updated. After loading a user device profile 422 from user device database, the server updates its derived attributes and velocity counters. A series of clicks is interpreted to understand the user actions, such as looking at customer reviews and searching for products. An updated profile 442 is sent to be scored in real-time by an iPrevent server 444. Such scoring is based on an empirically developed fraud model 446, which uses business rules, neural networks, data mining, and other technologies to predict a user's future behavior.

A Velocity Analyzer is used to build files that keep track of card/check/account/merchant usage and more. For example, if a payment card suddenly begins to rack up an unusually large number of transactions, the acquirer or the issuer may send a "call me" message to the merchant. Such tools are able to detect skimming and other fraud collisions.

Several aspects of card use behavior can be quite telling when fraud is afoot. The next Table lists some of the more import things for financial institutions to monitor.

1. Product purchasing patterns
2. Suspicious change in card activities
3. number of transactions over a window of time
4. payment methods history, typical purchasing
5. patterns at the merchant's site
6. e-mail address activity
7. Ship-to/bill-to activity
8. Refund Watch, Manual T-Log
9. Excessive Cash Back
10. Decline Analyzer
11. Excessive Failed Pre-Authorizations
12. Unattended and attended Transactions
13. Many others attributes and parameters FIG. 4D represents a relational system 460, in more detail than 304 in FIG. 3. It uses case-based reasoning to identify families and clusters of devices 462. Tests are made to see if any families 462 can be discerned that are related by physical location 464, device attributes 466, or historical behavior 468. The relational layer deals with clusters of devices instead of one user device at a time. The trustworthiness of user devices can be modified based on similar user devices, especially if they appear to be on the same network, or interrelated in other ways.

Some of the functions described here can be purchased as libraries or modules and added to a custom system. iPrevent™ is a commercial product of Brighterion, Inc. (San Francisco, Calif.) useful to compare possible matches from database 104 (FIG. 1) to either find a matching user device dossier or create a new user device dossier. iVelocity™ is a commercial product of Brighterion suitable for analyzing user clickstreams. These clickstreams result from visits to webpages on websites, and are analyzed to detect normal or abnormal behaviors.

FIG. 5 represents how user device risk levels can be accurately classified and categorized by a five-layer identification process 500 that includes endpoint 501, navigation 502, single-channel 503, multi-channel 504, and entity link 505 analyses. The first classification layer 501 is endpoint-centric, it identifies users by their behaviors and by the attribute signatures of their particular devices. Such attribute signatures can be extracted their browsers and used in the identification.

An endpoint client is embedded in a web page provided by a website server so it can be carried back to the user device by its browser and run in background to gather data. When the data collection is completed, the endpoint client automatically delivers the collected data up to the website server for immediate use in identifying this user device.

Smart-agent technology, data-mining, a decision tree, and case-based reasoning are all used to find candidate matches in a large, server-side database. Such will either find a matching device or the collected data will be used to create a new device dossier. If the user device was recognized, the data fields in its dossier are updated as needed.

Mobile devices have a variety of ID's built-in, some incidentally and others unintended. For example, the Android ID is randomly generated and will persist across phone resets. The SIM cards used universally by mobile providers in their phones provide unique identifiers, but these cards can be freely removed and plugged into another phone by any user. There are other inherent ID's that are less reliable for our purposes, but these nevertheless can be helpful to build confidence.

The navigation-centric layer is the second layer mentioned. It is used to track session activities and do a clickstream analysis in real-time. The user's clickstream behaviors are compared to previously observed patterns of normal, suspect, abnormal, and malware attack activities for this particular user and the population in general. Smart-Agents are used in these categorizations.

Clickstreams are the navigation pathways users follow through web pages and can be tracked by the webpage servers. The order of the pages a user views can be and which pages they visit can be quite telling and uncover their true motivations in the visit. An important conclusion can be made as to whether this is a real customer legitimately engaged in shopping or a fraudster bouncing around looking for a point of entry. Once the current user has been identified, a record of their navigation clicks is constructed and used in a behavior study to build a confidence score.

One way to follow a user's path through a web site is to look first at the Referrer header for each page, e.g., to see where they came from. It can be informative to know if they arrived here from a search engine, from a competitor, from another one of the server's pages, or if they just typed the URL straight into their browser.

A "site depth" is assigned to each web page to represent how far or how many clicks away it is from the home page. These statistics can be used to see if the visitor is convincingly browsing around and up/down a product tree like a real user would.

Velocity counters track how fast a visitor is moving around in several dimensions, such as their reputed location, times of day, clickstreams, items added to carts, number and length of browsing sessions, click rates and quantities, category changes, reviews read, etc. For example, if a review is read for a product before buying it. Another important visitor attribute to recognize is the number of category changes they make as they navigate. Typical users usually have a single product goal in mind, they don't bounce randomly between categories nor shop for two or more items simultaneously.

Suspicious browsing patterns are often generated by automated site-crawling scripts. Long-term profiling counters are useful to track the number of different products users have viewed or purchased in each category. The average prices and numbers of items per order are also useful points to remember. Big ticket buyers don't randomly drop from the sky unannounced. Tracking what cities and countries a user logs in from, and what local times of day they have been active can be used to distinguish legitimate users. A lot of fraud is generated from Eastern Europe, Asia, and Africa, and so those sources deserve extra scrutiny and wariness.

Any new behavior raises a red-flag and can be used to match the historical actions on file. If a legitimate user were to leave their account logged in and a stranger sat down, or if an account is stolen with fraud or malware, the new behavior outside historical actions would be an early warning of fraud.

The third layer, is account-centric for a specific channel, such as online sales. It monitors transactions, creates profiles associated with each user device and analyzes real-time behavior. A combination of technologies are employed, e.g., smart-agent, real-time profiling, geo-profiling, recursive profiling, long-term profiling, neural networks, data mining, data quality engine, fuzzy logic, business rules, and case-based reasoning.

The fourth layer is device-centric, with behavioral perspectives taken across multiple channels of user device contact with independent merchant servers. The device-centric layer correlates alerts and activities for each device/user obtained from more than one channel.

Layer five includes entity link analysis, it searches for relationships among the devices they encounter and the channels they employ. The entity link analysis layer inspects users and machines in an effort designed to detect organized criminal activities and misuse. For example, all devices of a device or type should be or could expected to be similarly affected by WINDOWS, ANDROID, or iOS system updates, patches, and new versions that occur in public and more or less around the same time. These broad transformations in the population can be used in the scoring of changes as normal/abnormal when identifying a particular user device.

Each of the five layers 501-505 can by implemented with Smart-Agents that interact and negotiate with each other in order to reach their individual and collective goals.

Algorithmic systems are very different and produce less reliable results in fraud risk assessments. Smart-Agents determine how to find a solution by providing each agent with goal information, e.g., situations that are desirable or undesirable.

Smart-Agents solve problems without needing extensive programming or sets of specific rules to be predefined that make for inflexibilities common to neural networks and genetic programming. Smart-Agents are able to effectuate runtime changes and adapt as needed.

Algorithmic programs follow successive operations applied in a fixed order. Algorithms enable computers to repeat long suites of logical operations tirelessly and accurately, which is great if the algorithm is fundamentally correct. Algorithmic programs are not equipped to take any initiative, and cannot stray even a little bit from each fixed line of code. It falls on the programmer to dictate, and spell out a precise succession of acts that the machine should follow. Often, there are just too many variables to code and too many decisions that can each be wrong. Business problems requiring even a minimum amount of reasoning are impossible to transcribe into algorithmic forms. Business decisions often require complex integration efforts involving large numbers of dynamic variables. And, having an algorithm available doesn't guarantee its practicality. Modest complexities can make it unwieldy.

Neural networks are not much better, they need to be trained, and many samples are needed in order to have a satisfactory result. Object-oriented languages require one to foresee, know, and program all the possible methods.

Smart-Agents can get past algorithmic limitations, and it is possible to design applications for them even when a suitable algorithm is unknown. Smart-Agents can adapt as the data they process changes. Each Smart-Agent is instructed to recognize information that favors the goals and is therefore "good", and information that disfavors the goals and is therefore "bad". Such instructions enable each Smart-Agent to automatically and autonomously make the "right" decision. This right-decision is referred to as the "THEN STATEMENT", as in a classic IF-THEN programming statement. An optimum THEN STATEMENT is relatively easy for a programmer to coin and get right.

The intelligence in the program springs from what the programmer embeds in each THEN STATEMENT. Smart-Agents can exist in a community of agents collected together to share a particular expertise, mimicking human society as they do. Smart-Agents can simulate human reasoning. Each Smart-Agent is able to operate independently according to its assigned functions, goals, representations of their environments, their runtime observations, acquired knowledge and interactions with other Smart-Agents. Systems of Smart-Agents marshal together many autonomous agents to interact and negotiate with one another.

An application's overall solution builds from the interactions as each Smart-Agent moves toward their respective goals.

Collections of Smart-Agents will appear to interact and negotiate to resolve complex and unpredictable problems, without any procedural programming or definition of rules. Each Smart-Agent is independent of the others, since each one of them only affects the others by the fact that they are in favor or disfavor of a specific goal. Smart-Agents are reusable in other applications.

Goal-satisfaction mechanisms direct Smart-Agents to accept or reject one incoming message over another. Every message is evaluated in terms of its being in favor of, in disfavor with, or neutral to reaching of a goal. For example, a private goal, a sending agent's goal, an organization's goal, or a system's goal. The Smart-Agents depend on each goal's opinion with respect to the current situation, the goal justifies the means. Smart-Agents can refuse messages, because they can charge messages as being favorable, unfavorable or neutral.

A bottom-line in fraud prevention systems is to decide how a particular transaction should be categorized. Every transaction is accepted by either a bad (fraud) agent or a good (normal) agent.

Other technologies can be usefully combined with Smart-Agents to produce even better results. Neural networks are a kind of algorithmic system that can interpret historical data and help identify trends and patterns against which to compare subject cases. Neural networks have the remarkable ability to solve problems related to detecting trends and patterns that humans or other computer techniques are unable to solve.

An Artificial Neural Network (ANN) models the ways in which biological nervous systems process information. The brain, e.g., consists of billions of processors, which process a large number of tasks concurrently. Neurons work collaboratively to solve the defined problem. Neural networks can resemble human reasoning, making them well suited to solve pattern recognition and forecasting problems.

ANN's have two primary parts, neurons, represented by neural units; and, synapses, connections between the neurons, which send signals from neuron to neuron. Those synapses can be excited (positive weight), or inhibited (negative weight). Most known neural networks have input layers for the agent to receive data from the environment, and output layers for the agent's potential actions. Others (like Back Propagation) have one or more intermediate layers between these two layers. These layers are massively interconnected, as the units on one layer are connected to those in the next layer. Just like the factors that shape a human, the factors that shape a neural network are its environment and its genetic makeup. Both its initial state and its training play a role in the ANN's development. It is through the critical training process that ANN's are taught how to arrive at the correct answer. A well-trained neural network will be more successful than a poorly trained neural network. The training refers to its environment and the experiences and samples that help shape it. The more samples and experience a neural network receives has a direct correlation with its likelihood of its success.

Case-based reasoning (CBR) can use past experiences or cases to solve new problems. Each "case" is translated into a list of steps to lead to a desirable outcome. The cases are stored and organized in a database, and used as an index for similar situations later. Solutions to complex problems can be found very quickly and accurately this way.

Being able to retrieve and manipulate past problem-solving examples accurately is important. Case-based systems search their case memories for an existing cases that match the input "specifications". As new cases are solved, the solutions are added to the case memory. Such will continue to grow the database of cases solved and increase the likelihood of success.

The goal is to find a case that matches the input problem and that proceeds directly to a solution. Thus making it possible to provide solutions to potentially complex problems quickly. If, on the other hand, an exact match cannot be found, the case-based system look for a similar one to the input situation, and then offer it as a potential solution.

How the system learns is when a nonperfect match is found that nevertheless solves the problem, the case is added to the systems case memory for future use. Each case is a recipe of steps that will lead to a particular outcome. A case is a connected set of subcases that form the problem-solving task's structure.

One of the key differences between rule-based and case-based knowledge engineering is that automatic case-indexing techniques drastically reduce the need to extract and structure specific rule-like knowledge from an expert. CBR systems retrieve relevant cases quickly and accurately from its memory. When a case should be selected for retrieval in similar future situations is the goal of case-indexing processes. As cases accumulate, case generalizations can be used to define prototypical cases that can be stored with the specific cases, improving the accuracy of the system in the long run.

The inductive-indexing capabilities in CBR systems provide several major advantages over neural networks and pattern-recognition techniques. Inductive systems can represent and learn from a wider range of feature types than either neural networks or pattern recognition. The ability to use richer feature sets for describing examples makes them at least as accurate and many time more precise. Case-Based Reasoning solves complex problems like planning, scheduling, and design by finding a similar, successful past plan, schedule, or design, and modifying it to meet the current problem's needs.

Another technology that can be added in a combinational approach is Fuzzy Logic. Fuzzy logic is able to account for areas that are not clearly defined. The logic can be extended to handle partial truths in situations where the answer lies somewhere in between what is true and what is false. Many of the big problems in organizations cannot be solved by simple yes/no or black/white programming answers. Sometimes answers come in shades of gray, where fuzzy logic proves useful. Fuzzy logic handles imprecision or uncertainty by attaching various measures of credibility to propositions. Fuzzy technology enables clear definition of problems where imperfect or partial knowledge exists, such as when the goal is "about 12 years old" or between "all" and "nothing". Traditional and classical logic typically categorize information into binary patterns such as: black/white, yes/no, true/false, or day/night.

The power of fuzzy logic is exponential when it is combined with other technologies like genetic algorithms, neural networks, and business rules. Many of the big problems in organizations cannot be solved by simple yes/no or black/white programming answers. Sometimes answers come in shades of gray, this is where fuzzy logic proves useful. Fuzzy logic handles imprecision or uncertainty by attaching various measures of credibility to propositions.

Genetic algorithms are able to address complicated problems with many variables and a large number of possible outcomes, by simulating the evolutionary process of "survival of the fittest" to reach a defined goal. They operate by generating many random answers to a problem, eliminating the worst and cross-pollinating the better answers. Repeating this elimination and regeneration process gradually improves the quality of the answers to an optimal or near-optimal condition. In computing terms, a genetic algorithm is a population of individuals represented by chromosomes, a set of character strings.

Genetic algorithms include three stages: building and maintaining a population of solutions to a problem, choosing the better solutions for recombination with each other, and using their offspring to replace poorer solutions. Each stage produces a new generation of possible solutions for a given problem.

In the first stage, an initial population of potential solutions is created as a starting point for the search process, each element of the population is encoded into a string (the chromosome), to be manipulated by the genetic operators. In the next stage, the performance (or fitness) of each individual of the population is evaluated with respect to the constraints imposed by the problem. Each individual of a population represents a possible solution to a given problem. Each individual is assigned a "fitness score" according to how good a solution to the problem it is. A potential solution to a problem may be represented as a set of parameters.

Business Rules, or Expert Systems are the most widely used commercial applications developed using artificial intelligence (AI). Many use expert systems to solve business problems. Expert systems model information at a higher level of abstraction. When these systems are implemented well they closely resemble human logic and become more reliable and easier to maintain. The goal is for the expert system to apply heuristic knowledge to give advice or make recommendations just like a human expert. Rules are used to represent a rule-of-thumb to specify a group of actions performed for a given situation. Rules are composed of if-then statements that comprise the necessary solution. An inference engine automatically matches facts against patterns and automatically determines which rules are applicable. This process of selecting rules against historical patterns will continue to repeat itself until no applicable rules remain. It is critical that the knowledge source is reliable, because the system is only as good the knowledge assimilated into the rules. One of the most difficult tasks in developing an expert system is extracting the knowledge from an expert so the rules can be written. The most widely known algorithms for compiling rules are RETE and TREAT.

Data mining, or knowledge discovery, in databases is the nontrivial extraction of implicit, previously unknown and potentially useful information from data. It is the search for relationships and global patterns that exist in large databases but are hidden among the vast amount of data. Using particular classifications, association rules and analyzing sequences; data is extracted, analyzed and presented graphically. Data mining, or knowledge discovery in databases is the nontrivial extraction of implicit, previously unknown and potentially useful information from data. It is the search for relationships and global patterns that exist in large databases but are hidden among the vast amount of data. Using particular classifications, association rules and analyzing sequences, data is extracted, analyzed and presented graphically.

Data mining algorithms always requires a number of different technical approaches to address data cleaning, sampling, clustering, learning classification rules, analyzing changes and detecting anomalies.

Descriptive Statistics is the process of obtaining meaningful information from sets of numbers that are often too large to deal with directly. While it is often impossible to calculate scores for all models when searching a large model space, it is often feasible to describe and calculate scores for a few equivalent classes of models receiving the highest scores. Prediction methods for this sort of problem always assume some regularity in the probability distribution.

Real-time profiling keeps track of activities over time-windows spanning seconds, minutes, hours, days, months or even years. These profiles can highlight suspicious changes in device activities, by looking at the number of transactions from a device over a window of time, histories of payment methods, typical purchasing from the device, patterns and clickstreams of the device at the merchant's site, e-mail address activity from the device, ship-to and bill-to activity, etc.

Single channels and single merchants, even large ones, don't usually generate enough device contact for rich dossiers to be collected. A centralized web-service that was provided device ID collections from all channels, and all merchants, and all acquirers would stand a much better chance of being able to reliably identify and authenticate every possible user that could attempt a transaction or log-on. Embodiments of the present invention therefore include centralized web-services and webservers that sell their authentication services to the public.

Figure 6:
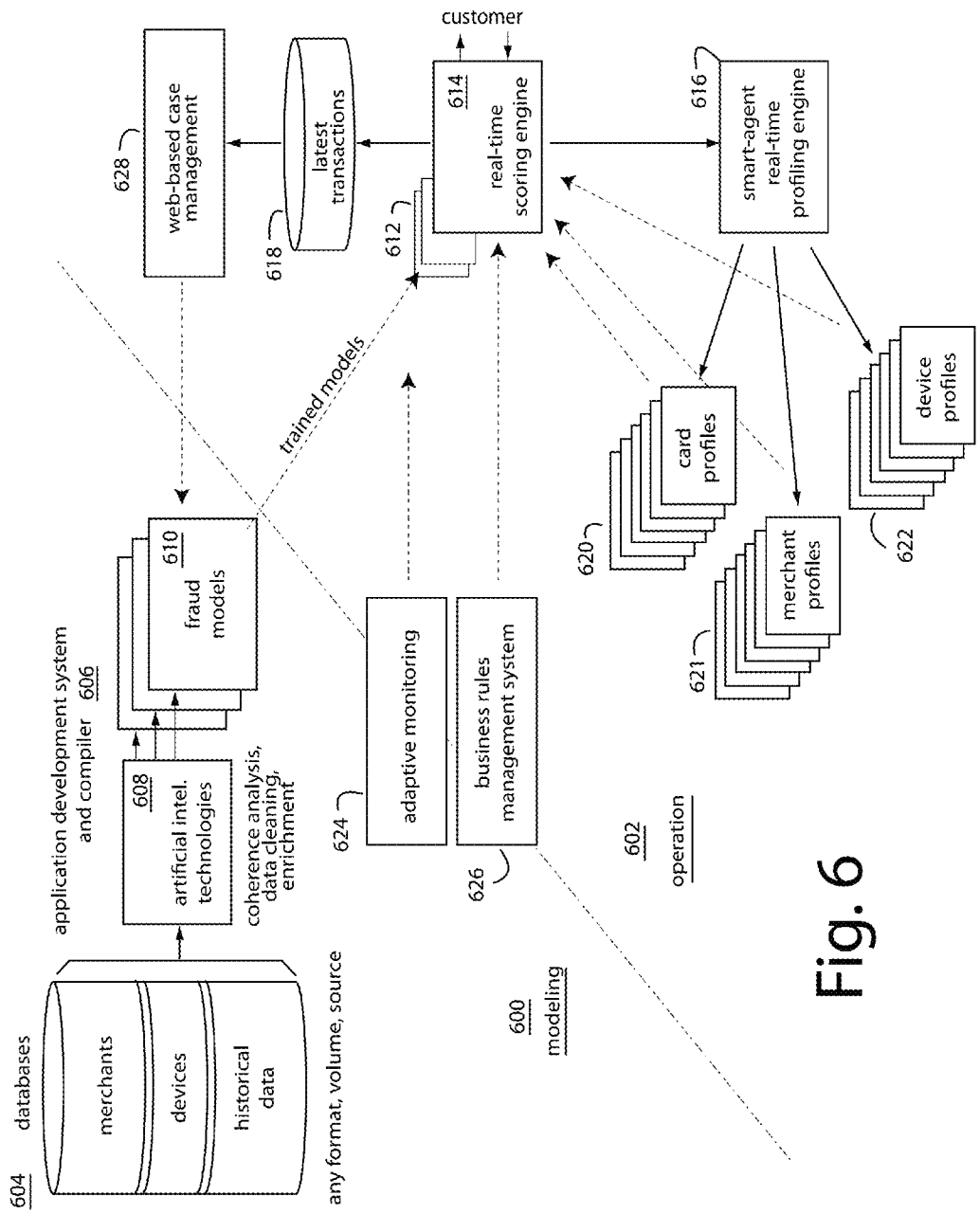
FIG. 6 is a functional block diagram of the development, modeling, and operational aspects of a single-platform risk and compliance embodiment of the present invention.

FIG. 6 represents the development, modeling, and operational aspects of a single-platform risk and compliance embodiment of the present invention. It represents an example of how user device identification and profiling is allied with accountholder profiling and merchant profiling to provide a three-dimensional examination of the behaviors in the penumbra of every transaction and authorization request. The development and modeling aspects are referred to herein by the general reference numeral 600. The operational aspects are referred to herein by the general reference numeral 600. In other words, compile-time and run-time.

The intended customers of embodiments of the present invention are financial institutions who suffer attempts by fraudsters at payment transaction fraud and need fully automated real-time protection. Such customers provide the full database dossiers 604 that they keep on their authorized merchants, the user devices employed by their accountholders, and historical transaction data. Such data is required to be accommodated in any format, volume, or source by an application development system and compiler (ADSC) 606. ADSC 606 assists expert programmers to use a dozen artificial intelligence and classification technologies 608 they incorporate into a variety of fraud models 610. This process is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud models 612 are delivered as a commercial product or service to a single platform risk and compliance server with a real-time scoring engine 614 for real-time multi-layered risk management. In one perspective, trained models 612 can be viewed as efficient and compact distillations of databases 604, e.g., a 1000:1 reduction. These distillations are easier to store, deploy, and afford.

During operation, real-time scoring engine 614 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 616 receives behavioral digests of the latest transactions 618 and uses them to update three populations of profiles 620-622. Specifically, a population of card profiles 620, a population of merchant profiles 621, and a population of device profiles 622 all originally generated by ADSC 606 and included in the trained models 612. These are all randomly and individually consulted in real-time by smart agent profiling engine 616 to understand what is "normal" for a particular card, merchant, and user device.

Real-time smart agent profiling engine 616 accepts customer transaction data and scores each line. Such scores are in accordance with business rules provided by a business rules management system (BRMS) 624 and any adaptive updates 626 needed to the original set of models 610 produced by artificial intelligence technologies and classifiers 608. A web-based case management system 628 uses false positives and false negatives to tighten up models 610. These are periodically used to remotely update models 612.

FIG. 7 represents a smart agent process 700 in an embodiment of the present invention. For example, these would include a smart agent population build and profiles, and smart agents and profiles. A series of payment card transactions (or user device parameters) arriving in real-time in an authorization request message is represented here by a random instantaneous incoming real-time transaction record 702.

Such record 702 begins with an account number 704. It includes attributes A1-A9 numbered 705-713 here. These attributes, in the context of a payment card fraud application would include data points for card type, transaction type, merchant name, merchant category code (MCC), transaction amount, time of transaction, time of processing, etc. In the context of user device authentication the parameters would include attributes for browser type, device manufacturer, user preferences, software revision, monitor type, display resolutions, etc.

Account number 704 in record 702 will issue a trigger 716 to a corresponding smart agent 720 to present itself for action. Smart agent 720 is simply a constitution of its attributes, again A1-A9 and numbered 721-729 in FIG. 7. These attributes A1-A9 721-729 are merely pointers to attribute smart agents. Two of these, one for A1 and one for A2, are represented in FIG. 7. Here, an A1 smart agent 730 and an A2 smart agent 740. These are respectively called into action by triggers 732 and 742.

A1 smart agent 730 and A2 smart agent 740 will respectively fetch correspondent attributes 705 and 706 from incoming real-time transaction record 702. Smart agents for A3-A9 make similar fetches to themselves in parallel. They are not shown here to reduce the clutter for FIG. 7 that would otherwise result.

Each attribute smart agent like 730 and 740 will include or access a corresponding profile data point 736 and 746. This is actually a simplification of the three kinds of profiles that were originally built during training and updated in an update. These profiles are used to track what is "normal" behavior for the particular account number for the particular single attribute.

Each attribute smart agent like 730 and 740 will further include a comparator 737 and 747 that will be able to compare the corresponding attribute in the instantaneous incoming real-time transaction record 702 for account numberx with the same attributes held by the profiles for the same account.

Comparators 737 and 747 should accept some slack, but not too much. Each can throw an exception 738 and 748, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings.

These exceptions are collected by a smart agent risk algorithm 750. One deviation or exception thrown on any one attribute being "abnormal" can be tolerated if not too egregious. But two or more should be weighted more than just the simple sum, e.g., $(1+1)^n=2^n$ instead of simply $1+1=2$. The product is output as a smart agent risk assessment 752. This output is the equivalent of an independent and separate vote or fraud score.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for identifications of high risk user devices visiting websites, comprising:

extracting a clickstream behavior related to the particular paths and order of webpages an individual client user follows with a sequence of user clicks when logged into a website presented on a network by a computer network server by using a customer website server to follow each of its users' paths through each Internet website it presents using a referrer header and assigning a site depth value representing how far particular webpages are away in clicks from a home page, and employing velocity counters to track how fast each user would need to move between purported locations, at what were the times of day of an activity, using what clickstream patterns, what items were added to carts, what were the number and length of those browsing sessions, the click rates employed, and the quantities, category classification names, and any reviews read for particular purchases;

identifying distinctive client users according to recordings of their past clickstream behaviors and remotely detectable user device configurations and attributes that are enhanced by an endpoint client that is forced to download with an Internet webpage to a user device and rendered collectable by the customer server that forwards activity reports to a centralized server which are organized in a user device dossier database;

recording said client user clickstream behaviors and comparing them to previously analyzed patterns classified as normal, suspicious, and fraudulent activity to calculate a fraud score by the centralized server and that designates a corresponding transaction as approved, requires further investigation, denied, or referred to law enforcement;

tracking client user session activity and pattern-matching said clickstream behavior to profiles of normal-suspect-abnormal-malware patterns with a smart agent combined with an artificial neural network and executed within the centralized server;

monitoring and analyzing client user online transactions based on an empirically developed fraud model using data mining and neural networks according to pre-determined business rules and statistical models and that predict a client user's future behavior, and updating corresponding profiles of users and accounts with such predictions that are stored in a non-transitory database;

correlating alerts and activities with a relational system including case-based reasoning to identify families and clusters of user devices, and modifying a trustworthiness factor in proportion;

searching for relationships amongst client users and the communications channels they employ with a five layer identification process executed by the centralized server and implemented with interacting and negotiating smart agents that produce a non-transitory risk assessment score with an algorithm; and identifying and authenticating user devices that accessed the Internet webpages of the customer website server according to said non-transitory risk assessment score and communicated from the centralized server.

* * * * *